United States Patent [19]

Lutz et al.

[11] Patent Number: 4,501,348

[45] Date of Patent: Feb. 26, 1985

[54] TORSIONAL OSCILLATION DAMPER WITH LATERALLY DISPLACEABLE DAMPER MEMBER

[75] Inventors: Dieter Lutz, Schweinfurt; Wolfgang Thieler, Hassfurt-Uchenhofen, both of Fed. Rep. of Germany

[73] Assignee: Sachs-Systemtechnik GmbH, Schweinfurt, Fed. Rep. of Germany

[21] Appl. No.: 401,377

[22] Filed: Jul. 23, 1982

[30] Foreign Application Priority Data

Jul. 31, 1981 [DE] Fed. Rep. of Germany ....... 3130227

[51] Int. Cl.³ .............................. F16D 3/64; F16D 3/80
[52] U.S. Cl. ............................... 192/106.1; 192/70.17; 464/24
[58] Field of Search ............... 192/70.17, 106.1, 106.2; 464/24, 26

[56] References Cited

U.S. PATENT DOCUMENTS

| | | | |
|---|---|---|---|
| 2,337,134 | 12/1943 | Thelander | 192/106.2 |
| 2,674,863 | 4/1954 | Thelander | 192/106.2 |
| 4,418,812 | 12/1983 | Lech, Jr. | 192/70.17 |

FOREIGN PATENT DOCUMENTS

| | | |
|---|---|---|
| 1285339 | 12/1968 | Fed. Rep. of Germany . |
| 14604 | 10/1966 | Japan . |
| 31004 | 10/1966 | Japan . |
| 237338 | 7/1925 | United Kingdom . |
| 266212 | 2/1927 | United Kingdom . |
| 305304 | 2/1929 | United Kingdom . |
| 858472 | 2/1959 | United Kingdom . |
| 898040 | 6/1962 | United Kingdom . |
| 968623 | 9/1964 | United Kingdom . |
| 1084240 | 9/1967 | United Kingdom . |
| 1131693 | 10/1968 | United Kingdom . |
| 2078906 | 1/1982 | United Kingdom . |

*Primary Examiner*—Rodney H. Bonck
*Assistant Examiner*—James J. Merek
*Attorney, Agent, or Firm*—Toren, McGeady and Stanger

[57] ABSTRACT

A torsional oscillation damper having first and second damping members mounted for rotation about a common rotational axis and a coupling member arranged in torque transmitting engagement therebetween, the coupling member being in fixed rotative engagement with the first damper member and capable of being axially displaced relative to at least one of the damper members in the direction of the rotational axis. A spring device operates to apply a force to the coupling member against the axial direction of displacement thereof and the coupling member is movable over an axial slip surface between the coupling member and the second damper member acting during relative rotation between the coupling member and the second damper member.

15 Claims, 6 Drawing Figures

TORSIONAL OSCILLATION DAMPER WITH LATERALLY DISPLACEABLE DAMPER MEMBER

The present invention relates generally to torsional oscillation dampers particularly for clutch discs of motor vehicle clutches wherein a spring device is arranged between friction facing carrier means and a hub part and a hydraulic damping device.

A torsional oscillation damper of the type to which the present invention relates is disclosed, for example, in U.S. Pat. No. 2,513,379. In this known torsional oscillation damper, torsion springs are formed as helical pressure springs and arranged so as to extend approximately tangentially around a median radius to the axis of rotation of the oscillation damper. Some of the springs are enclosed by pot-shaped covers which are arranged telescopically and have openings through which the damping fluid arranged in the inner space of the oscillation damper may flow inwardly and outwardly. Structures of this type have, up to now, not been successful because they possess only limited angular deflection and their structure is relatively complicated.

Accordingly, the present invention is directed toward provision of a torsional oscillation damper which will ensure a large angular deflection and which will enable oscillation damping with minimum wear and which can be manufactured at favorable cost.

SUMMARY OF THE INVENTION

Briefly, the present invention may be described as a torsional oscillation damper comprising a first damping member and a second damping member mounted for rotation about a common rotational axis, a coupling member operatively arranged in torque transmitting engagement between the first and second damping members, said coupling member being in fixed rotative engagement with said first damping member and axially displaceable relative to at least one of said damping members in the direction of said rotational axis, spring means applying a spring force to said coupling member against axial displacement thereof, said spring force acting in the direction of said rotational axis between said coupling member and said first damping member, with axial slip surface means between said coupling member and said second damping member acting during relative rotation between said coupling member and said second damping member. In accordance with the present invention, limitations with regard to angular deflection which arise in known prior art devices may easily be avoided by diverting rotational movement toward an axially acting spring device over sloped or inclined surfaces.

The torsional oscillation damper of the invention is particularly suitable for clutch discs of motor vehicle friction clutches wherein one of the damper parts is nonrotatably connected with a friction facing carrier of the clutch disc and the other damper part is nonrotatably connected with the hub part of the clutch disc. It is preferable that the coupling part be seated between surfaces of the first damper part, which surfaces are directed opposite to one another, and that it be acted upon axially in an opposite direction by springs so that the oscillation damper may be turned from a middle or center position in both directions of rotation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
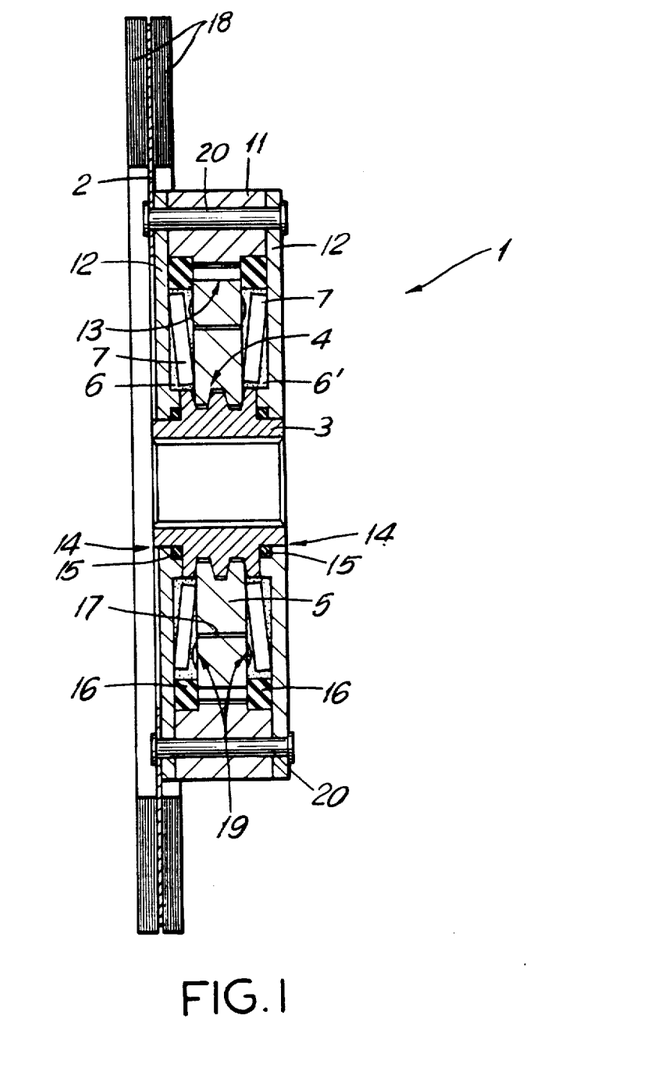
FIG. 1 is a longitudinal sectional view through a complete torsional oscillation damper for a motor vehicle clutch disc.

Referring now to the drawings, wherein similar reference characters are used to identify similar parts in the various figures thereof, there is shown in FIG. 1 a complete clutch disc for a vehicle clutch which is equipped with a torsional oscillation damper. The assembly of FIG. 1 includes a hub member 3 which is provided with internal teeth on the inner circumference thereof for connection in rotative engagement with a gear assembly input shaft (not shown).

A friction facing carrier 2 is provided radially outwardly with friction facings 18 for gripping of the clutch (not shown) between flywheel and pressure plate. The friction facing carrier 2 is connected with a ring 11 by means of rivets 20, with the ring 11 forming a space through lateral cover discs 12. The space thus formed is closed off radially inwardly by the hub member 3.

In addition, the hub member 3 is rotatably supported but also axially affixed relative to the cover discs 12 in boreholes 14 of the cover discs 12. Sealing means in the form of seals or packings 15 are provided between the discs 12 and the hub member 3.

In the annular interior space formed through structural component parts 11, 12, and 3, an axially shiftable or displaceable coupling member 5 is arranged. The coupling member 5 is provided with trapezoidal threads 4 relative to or opposite the hub member 3. When both parts rotate relative to one another, an axial shifting or displacement of coupling part or structural component 5, respectively, relative to parts 11 and 12 is thus effected.

The structural component part or coupling member 5 also divides the space into a pair of chambers 6 and 6'.

In order to transmit torque between the hub member 3 and the ring 11, structural component part 5, which is approximately disc-shaped, is provided with an axially extending toothing 13 on its outer surface, which toothing engages a corresponding toothing in ring 11.

In order to generate a spring force during this relative rotation, a spring 7, which comprise Belleville springs, are arranged in both the chambers 6 and 6', respectively, with the spring 7 being supported respectively on the coupling member 5 and on a respective cover disc 12 as well. Both the chambers 6 and 6' are at least partially filled with a damping fluid. In order to achieve an exact damping force, coupling part 5 is, on the one hand, provided with throttle openings 17 which extend approximately in the axial direction and which connect the chambers 6 and 6' with each other. On the other hand, at least the axially extending toothing 13 is sealed by means of sealing or packing member 16 which provide a seal relative to the chambers 6 and 6'. In this manner, none of the damping fluid can escape through the toothing 13.

In the operation of the torsional oscillation member 1 in accordance with FIG. 1, when torque is applied between the friction facings 18 and the hub part 3, rotation of the hub part 3 relative to the members 11 and 12 occurs so that the axially shiftable coupling part 5, which is arranged nonrotatably but axially displaceable relative to the ring 11 through the toothing 13 undergoes axial displacement through the relative rotation between it and the hub member 3 over the trapezoidal thread 4 and it undergoes this axial displacement against the force of one of the two spring members 7.

Assuming shifting of the coupling member 5 in accordance with FIG. 1 to the right, there occurs an increase in the stressing of the spring 7 on the right side and a lessening of the space of the chamber 6'. A damping force is thus produced through displacement of the damping fluid from the chamber 6' through the throttle opening 17 into the chamber 6 and the damping force acts against the torque in addition to the spring force generated by the right-hand spring 7. Axial shifting of the coupling part 5 simultaneously effects elastic deformation of the sealing members 16 so that these sealing members prevent penetration of damping fluid through the toothing 13 in a manner previously described.

Through a corresponding selection of Bellville springs 7 and the lead or slope of the trapezoidal thread 4, it is possible to achieve an increase of torque within the torsional oscillation damper 1 over a relatively large turning angle of the structural component parts among one another. This characteristic will largely meet the current demand in the motor vehicle industry in particular. It is clear that considerably larger twisting or turning angles are achievable as compared with arrangements in accordance with the prior art wherein, for example, screw springs tangential to the rotational axis of the clutch disc are utilized. Furthermore, influencing of the spring characteristics can be achieved through simple means, for example by arranging stops 19 on the shiftable coupling part 5. Such stops 19 can change the location of application of the force of the spring 7 during the process of rotation so that, for example, a progressive spring characteristic can be realized in this manner. Likewise, it is readily possible to alter the damping force in accordance with the turning angle as well by, for example, attaching the throttle opening 17 in the coupling member 5 in such a way that the openings end in an area in the chambers 6 and 6' respectively in which influencing of the discharge openings through the alteration of the position of the Belleville springs 7 results as well.

The torsional oscillation damper depicted and described acts for both rotating directions, i.e., on tensile and on axial loads. It is also readily possible to present corresponding desired characteristics through a corresponding selection of different springs. A turning angle of more than 30° is readily achieved with the construction indicated and the torque is solely dependent on the distance and on the turning angle, respectively, the attainable damping being likewise regarded as a function of the angle or of the angular speed, respectively, wherein a high service life expectancy may be anticipated and low production costs may result.

It should be noted that the chambers 6 and 6' are, in an advantageous manner, not completely filled with damping liquid so that the possibility for expansion is provided during rise in temperature depending on operation. Through the arrangement of the seals 15 in the radially inner area of the annular chambers 6 and 6', the possibility is provided for the damping fluid to be displaced radially outwardly during operation through the rotating torsional oscillation damper so that a removal of the load on these seals is thereby achieved.

Figure 2:
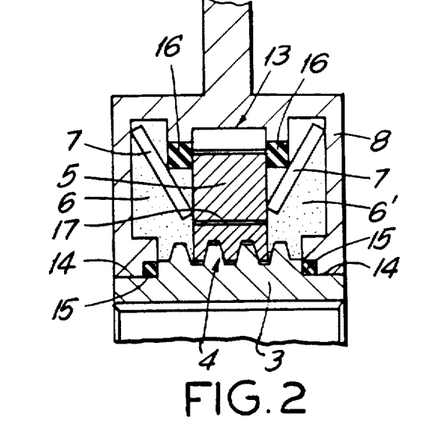
FIGS. 2, 3, and 4 are longitudinal sectional views through the respective upper halves of torsional oscillation dampers in accordance with different embodiments of the invention relative to the device shown in FIG. 1.
Figure 3:
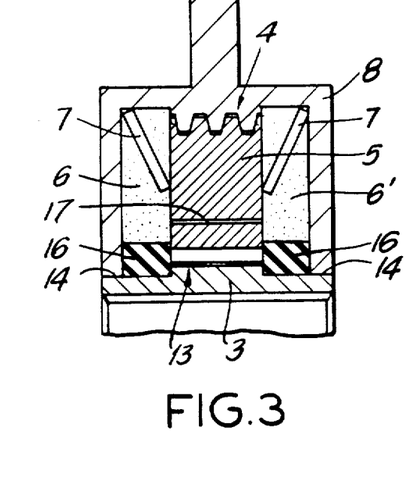
Figure 4:
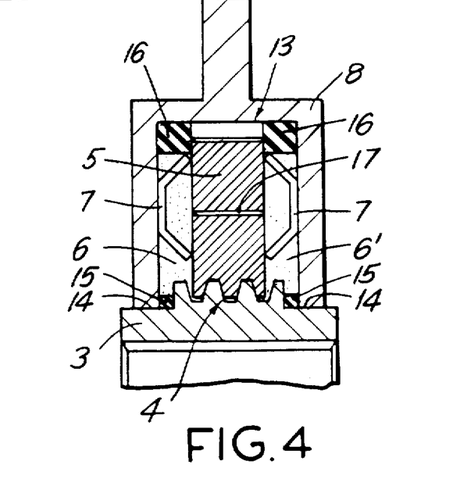

FIGS. 2-4 show other embodiments of the invention wherein possible alteration of the structure of the components of the oscillation damper shown in principle in FIG. 1 may be effected.

FIG. 2 shows in particular a special arrangement of the sealing members 16 which, on the one hand, are applied to the coupling part 5 but which, on the other hand, are applied to the Belleville spring 7 approximately in the middle of its radial extension. A small load or stress of the sealing members 16 thereby results since these sealing members 16 can likewise yield relative to their abutment with the Belleville spring 7, in the axial shifting of the coupling member 5.

As compared with FIG. 1, FIG. 3 shows a functional reversal of the coupling member 5. In the present case, the trapezoidal thread 4 is first of all arranged on a structural component part 8 which defines the chambers 6 and 6' and secondly on the outer circumference of the coupling part 5. Accordingly, the axially extending toothing 13 must be arranged on the inner circumference of the coupling part 5 as well as on the hub member 3. The function of this torsional oscillation damper is not impaired through this reversal. Instead, the sealing member 16 can be utilized here not only for inner sealing of the two chambers 6 and 6', respectively, relative to the toothing 13, but they also simultaneously form seals for the chambers 6 and 6' outwardly thereof. The construction and manner of operation of the structural arrangement of this embodiment is essentially the same as that previously described in connection with FIGS. 1 and 2.

In contrast to the previously described embodiments, the embodiment of FIG. 4 includes Belleville springs 7 which are not formed as structural component parts concentric to the common rotational axis, but rather they are formed as substantially smaller Belleville springs of which several can be arranged behind one another in the circumferential direction. In this manner, the adjustment or adaptation of the spring action of the torsional oscillation damper will be thereby more easily effected in that the quantity of these Belleville springs can easily be changed. In this context, it should be noted that in the general sense, the Belleville springs can also easily be arranged behind one another as a stack in order to achieve corresponding spring forces.

Figure 5:
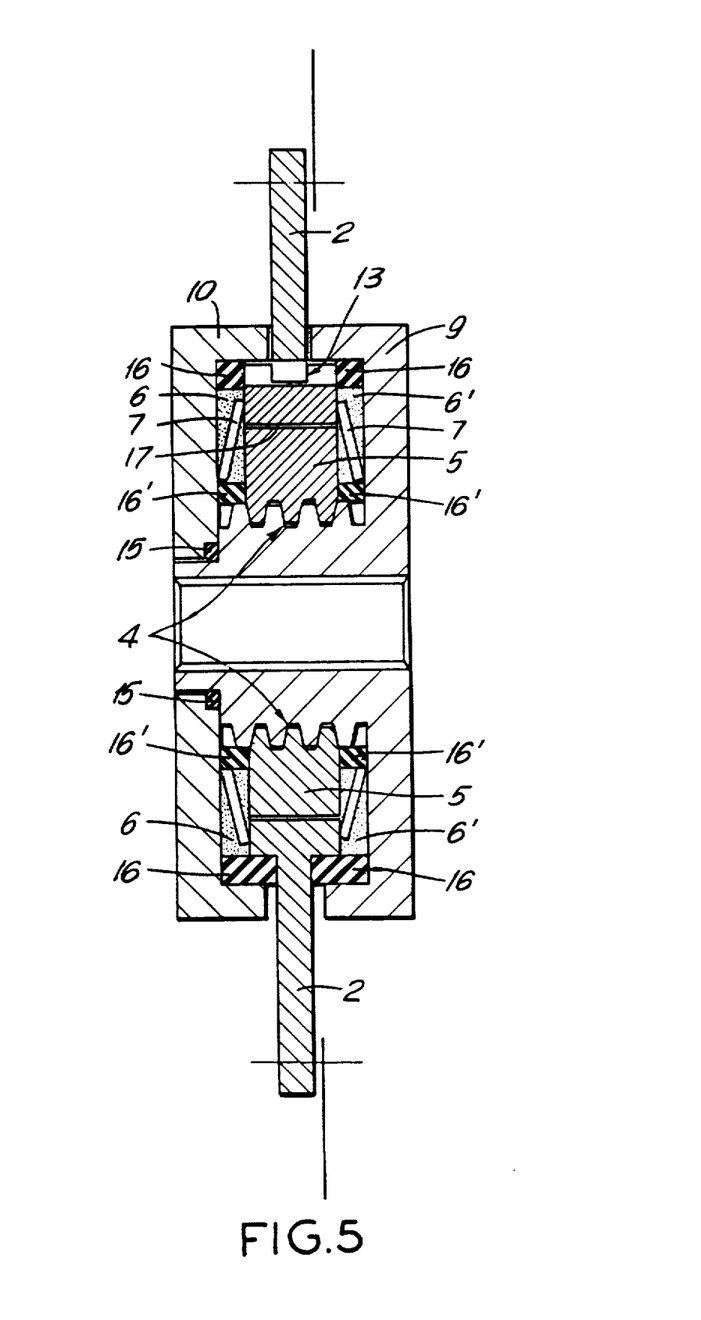
FIG. 5 is a longitudinal sectional view through a torsional oscillation damper wherein the upper half of FIG. 5 shows one embodiment having structural differences relative to another embodiment shown in the lower half of FIG. 5, and FIG. 6 an axial cross-sectional view through another embodiment of a motor vehicle clutch disc including a torsional oscillation damper.

In FIG. 5, two different embodiments of the torsional oscillation damper in accordance with the present invention are shown, with one embodiment being shown in the upper half of FIG. 5, and another embodiment being depicted in the lower half. The upper half shows an embodiment wherein the structural component part 9 forming an annulus is formed as one piece with the hub member, described in connection with previous figures of drawing. In order to build in the axially displaceable coupling member 5 as well as the friction facing carrier 2, a cover 10 is necessary which is arranged in a manner similar to the structural component part 9, rotationally symmetrically or dynamically balanced relative to the common rotational axis and which leaves open a corresponding opening for the penetration of the friction facing carrier 2 only radially outwardly relative to the structural component part 9. The friction facing carrier 2 directly engages through the toothing 13 in a corresponding opposite or complementary toothing in the coupling part 5 for the nonrotatable but axially loose connection of the two parts. The axially shiftable coupling part 5 is, in the manner previously described, provided with a trapezoidal thread 4 on its inner diameter and the trapezoidal thread 4 engages in a corresponding trapezoidal thread of the structural component part 9. The space formed by the two structural component parts 9 and 10 is thus divided by a coupling part 5 into a pair of chamber 6 and 6' which are, respectively, filled at least partially with a damping fluid and each of which receive one or more Belleville springs 7.

In the present case, a sealing member 16' is arranged in the radially inner area of each of the chambers 6 and 6', respectively, relative to the trapezoidal thread 4, which sealing member 16' prevents the penetration of damper fluid through the trapezoidal thread and also serves as a radial guide for the respective Belleville spring. Moreover, a sealing member 16 is arranged in a known manner in an arrangement axial to the toothing 13. Further, a seal 15 is arranged between the two structural component parts 10 and 9 which is rendered unnecessary under certain circumstances through the arrangement of the sealing member 16'. Moreover, the structural component part which forms the coupling member 5 is provided with one or more throttle openings or throttle channels, respectively, for the connection of the two chambers 6 and 6' with one another.

In the operation of this torsional oscillation damper, when torque is introduced in the oscillation damper, relative rotation results between the friction facing carrier 2 and the structural component parts 9 and 10 which are nonrotatably connected over a corresponding toothing with a gear assembly input shaft (not shown). This relative rotation is transmitted through the toothing 13 to the axially shiftable structural component or coupling part 5 which is connected at its inner circumference through the trapezoidal thread 4 with the structural component part 9. Axial displacement results from this rotation of the coupling part 5 in connection with the trapezoidal thread, which axial displacement occurs against the force of one of the two Belleville springs 7. One of the chambers 6 or 6' is reduced in this manner and is completely sealed through the two sealing members 16 and 16' and there thus occurs displacement of the damping fluid contained in this chamber only over the throttle opening 17 on the opposite side. Since the corresponding chamber located on the opposite side expands at the same rate as the other diminishes, it is not necessary, for example, to provide compensating space. It is only advantageous not to completely fill the two spaces with damping fluid so that the capacity to respond to temperature-related changes is retained.

In the embodiment exemplified in the lower half of FIG. 5, some structural modifications are introduced as compared with the embodiment of the upper half. For example, by forming the friction facing carrier 2 and the axially shiftable coupling part 5 in one piece, the necessity for the toothing 13 is eliminated. For this reason, the friction facing carrier 2 also undergoes axial movement of the structural component part 5. The sealing members 16 serve in the case of this embodiment only to seal the two chambers 6 and 6' relative to the atmosphere. The remaining structural component parts shown correspond generally to those shown in the upper half of FIG. 5. Likewise, the functioning of the embodiment depicted in the lower half of FIG. 5 is generally the same as that described in connection with the upper half of FIG. 5.

It is generally possible within the purview of the invention to employ helical springs as opposed to the Belleville springs shown in all the embodiments. Moreover, it should be noted that the damping fluid which is usually not compressible, may also be substituted or replaced by compressible solid materials which are known which may be, for example, in the form of silicone rubber.

Thus, it will be seen that particularly in applications wherein one of the damper parts is seated on a shaft so as to be displaceable in any event, as for example in the case of the hub part of the clutch disc which is axially displaceable on the gear shaft, the coupling part may be rigidly connected with the structural component part which forms the first damper member. Thus, both damper members will be axially displaced against one another during the damping action. Thus, such a result would be achieved in the embodiment wherein the coupling part 5 is annular and is arranged so as to be axially displaceable between the surfaces 12 which are directed axially opposite to one another and which are firmly connected axially with the first damper member (2 or 3) and wherein the axially acting springs 7 are arranged axially on both sides of the coupling part 5 between the coupling part 5 and the surfaces 12.

However, preferred embodiments also involve arrangements wherein the damper members are axially fixed to one another, wherein the coupling part is arranged so as to be axially displaceable relative to the two damper members. The nonrotatable connection to the first damper member can, for example, be formed as an axially extending toothing or spline.

The torsional oscillation damper in accordance with the present invention is preferably combined with a hydraulic damper device. This may be achieved in a structurally simple manner by arranging the coupling member in the annulus which is at least partially filled with the damper fluid and by dividing this annulus into the two chambers 6 and 6' which are connected with each other through the throttle channel 17. During axial displacement of the coupling member in the annulus forming the chambers 6 and 6', the damper fluid is pumped from one chamber to the other through the throttle channel. For a defined or precise damper action, the gaps arising through the toothing between the coupling part and the damper members are preferably sealed. The throttle channel preferably extends all the way through the coupling member, but it can also be provided in one of the damper members. Damping behavior depending upon position may be achieved in that the throttling channel or its opening, respectively, is covered or opened, respectively, depending upon the position of the coupling member relative to the damper member. When the throttle channels extend at least partially in the damper members, the coupling member may be utilized for covering the opening. To the extent that the throttle channel extends in the coupling member, parts of the springs may be utilized for covering the opening.

As previously indicated, the springs are preferably Belleville springs or plate or disc springs, but if necessary Belleville spring stacks or bundles may be utilized. The Belleville springs may be arranged axially one behind the other or next to one another in the circumferential direction of the coupling member. Stops may be provided on the coupling part which will be applied to adjust the spring action. Depending upon the position of the coupling member, there may thus be achieved changes in spring characteristics or qualities depending upon the position of the parts.

Thus, with the present invention, there may be provided a torsional oscillation damper suitable particularly for the clutch disc of a motor vehicle friction clutch which has two damper members 2, 3 which are rotatable relative to one another around a common rotational axis, with the damper members 2, 3 being coupled or connected with one another over an axial slip surface and a coupling part 5. During relative rotation of the damper members 2, 3, the coupling part 5 displaces against the axial force of the spring 7. The coupling part can be firmly connected axially with one of the damper members, but is preferably axially displaceable and nonrotatably coupled with this damper member. The coupling part 5 preferably divides a spacing which is outwardly sealed and which is at least partially filled with damping fluid into two chambers 6 and 6' which are in communication with one another through the throttle channel 17. With the present invention, torsional oscillation dampers providing large damper rotational angles can therefore be achieved.

Figure 6:
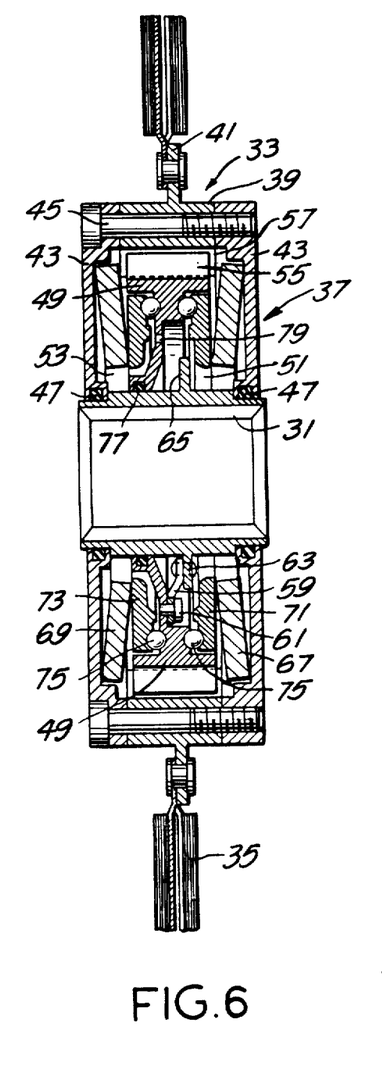

FIG. 6 shows an axial cross-sectional view through another embodiment of a clutch disc for a motor vehicle friction clutch. Like the preceding embodiments, the clutch disc includes a torsional oscillation damper 37 showing hydraulic damping qualities and spring damping qualities but reduced friction losses. Similar to the embodiment according to FIG. 1, the clutch disc includes a hub part 31 coupled in fixed rotative but axially displaceable engagement with a gear assembly input shaft. On the hub part 31 a friction facing carrier 33 including annular facings 35 is rotatably supported but also axially affixed. In the torque transmitting path between the hub part 31 and the friction facing carrier 33 there is arranged a torsional oscillation damper 37 which hydraulically and spring-elastically dampens torsional oscillations between the hub part 31 and the friction facings 35.

The torsional oscillation damper 37 includes a ring 39 which coaxially encircles the hub part 31 and which has a radial circumferential flange 41 on which the friction facings 35 are mounted. Axially on both sides of the ring 39 annular cover discs 43 are fastened with screws 45. The cover discs 43 are sealed on their inner circumference relative to the hub part 31 by means of sealing rings 47.

The hub part 31 which essentially has the form of a sleeve, the ring 39, and the two cover discs 43 encircle an annular chamber which is divided by an annular part 49 into two annular chambers 51 and 53 resp., which are axially juxtaposed. The outer circumference area of the annular part 49 has a T-shaped cross section and includes an axial thrust toothing 55 for engagement with a complementary axial thrust toothing 57 provided on the inner circumference of the ring 39. The annular part 49 is coupled in fixed rotative but axially movable engagement with the hub part 31 by means of elongated bands or tangential straps 59 which extend approximately in the tangential direction of the annular part 49. The tangential straps 59 which are distributed in circumferential direction around the hub part 31 are each mounted at their ends with screws 61 and rivets 63 resp., on the annular part 49 and a radial flange 65 of the hub part 31 respectively. If, in case of torsional oscillations, the hub part 31 and the friction facing carrier 33 are rotated relative to each other, the annular part 49 is shifted axially, changing the ratio of the volumes of the annular chambers 51, 53.

The annular part 49 is clamped axially between two annular plate or Belleville springs 67 and 69 resp., which are arranged coaxially relative to the annular part 49. The Belleville springs 67, 69 are supported on their radially outer circumference on the cover discs 43 and on their radially inner circumference on annular, coaxial roller bearing discs 71, 73 which are arranged on both sides of the annular part 49. Annular raceway grooves for bearing balls 75 are provided in oppositely directed surfaces of the roller bearing discs 71, 73 and in the annular part 49 respectively. The bearing discs 71, 73 and the bearing balls 75 in connection with the annular part 49 form axial pressure bearings which reduce friction when the annular part 49 rotates relative to the Belleville springs 67, 69. In this way, torsional oscillations between the hub part 31 and the friction facing carrier 33 can be dampened at low friction losses.

The annular part 49 is sealed on its inner circumference relative to the hub part 31 by means of a sealing ring 77. Both annular chambers 51, 53 are filled at least partially with a hydraulic fluid which is displaced through at least one throttle opening 79 from one annular chamber into the other when the annular part 49 moves axially relative to the hub part 31. Thus, in addition to the spring damping qualities, the clutch disc also provides hydraulic damping qualities.

While specific embodiments of the invention have been shown and described in detail to illustrate the application of the inventive principles, it will be understood that the invention may be embodied otherwise without departing from such principles.

What is claimed is:

1. A torsional oscillation damper comprising
   a first damping member and a second damping member mounted for rotation about a common rotational axis;
   a coupling member operatively arranged in torque transmitting engagement between said first and second damping members;
   said coupling member being connected in fixed rotative engagement with said first damping member and being axially displaceable relative to at least one of said damping members in the direction of said rotational axis; and
   spring means applying a spring force to said coupling member against axial displacement thereof, said spring force acting in the direction of said rotational axis between said coupling member and said first damping member;
   said coupling member including axial slip surface means between said coupling member and said second damping member acting during relative rotation between said coupling member and said second damping member;

said coupling member is annular in configuration and is arranged to be axially displaceable between a pair of surfaces which are axially directed opposite to one another and which are firmly axially connected with said first damper member, said axially acting spring means being arranged axially on both sides of said coupling member between said coupling member and said surfaces;

said coupling member is arranged in an annulus which encloses said rotational axis and is sealed outwardly with said coupling member dividing said annulus into two chambers which are axially juxtaposed and wherein said annulus is filled at least partially with damping fluid with said two chambers being connected with each other through at least one throttling channel.

2. A damper according to claim 1 wherein said first and second damper members are axially affixed to one another and wherein said coupling member is axially displaceable relative to both said first and second damper members.

3. A damper according to claim 1 wherein said throttling channel extends completely through said coupling member.

4. A damper according to claim 1 wherein said spring means cover said throttling channel in accordance with the position thereof when said throttling channel extends through said coupling member.

5. A damper according to claim 4 wherein said coupling member is provided with axially extending toothing, which toothing extends essentially along its entire axial width and which engages in a complementary toothing on said first damper member, and wherein elastic sealing rings are arranged axially laterally to said axial toothing in each of said chambers with said sealing ring sealing the axial side surfaces of said annulus.

6. A damper according to claim 1 wherein said spring means are Belleville springs.

7. A damper according to claim 6 wherein said coupling member includes stops which engage said spring means with the spring characteristics of said spring means being thereby altered depending upon the axial position of said coupling member.

8. A damper according to claim 1 wherein said axial slip surface means comprise threaded sections formed on said coupling member and on said second damper member, said threaded sections engaging within one another telescopically.

9. A damper according to claim 8 wherein said threaded sections are formed as trapezoidal threads.

10. A damper according to claim 1 wherein said coupling member is connected in fixed rotative engagement with said first damping member by means of at least one axially elastic strap extending essentially tangentially relative to said coupling member.

11. A damper according to claim 1 wherein said axial slip surface means are provided on the outer circumference of said annular coupling member and on the radially outer circumference of said annulus respectively, and wherein the inner circumference of said coupling member is sealed relative to the radially inner circumferential surface of said annulus by means of a sealing ring.

12. A torsional oscillation damper comprising a first damping member and a second damping member mounted for rotation about a common rotational axis;

a coupling member operatively arranged in torque transmitting engagement between said first and second damping members;

said coupling member being connected in fixed rotative engagement with said first damping member and being axially displaceable relative to at least one of said damping members in the direction of said rotational axis; and spring means applying a spring force to said coupling member against axial displacement thereof, said spring force acting in the direction of said rotational axis between said coupling member and said first damping member;

said coupling member including axial slip surface means between said coupling member and said second damping member acting during relative rotation between said coupling member and said second damping member;

one of said first and second damper members is nonrotatively connected with a friction facing carrier of a motor vehicle clutch disc and wherein the other damper member is nonrotatively connected with a hub part of said clutch disc;

said coupling member is located within an annulus having an inner side and an outer side and formed on the inner side thereof by said hub part and wherein said friction facing carrier or a part which is nonrotatively connected with said friction facing carrier forms at least one part of the outer side of said annulus, said coupling member being arranged so as to be axially displaceable between surfaces which are axially directed opposite to one another and which are firmly axially connected with said first damper member and which form the axial sides of said annulus, said axially acting spring means being arranged axially on both sides of said coupling member between said coupling member and said axially directed surfaces.

13. A damper according to claim 12 wherein one of said damping members comprises a ring cylinder nonrotatively connected with said friction facing carrier which operates to define said annulus, with said axially directed surfaces being defined on two annular cover discs arranged axially on both sides of said ring cylinder, said hub part being guided in openings of said cover discs.

14. A damper according to claim 12 wherein said axial slip surfaces are provided on said hub part.

15. A torsional oscillation damper comprising a first damping member and a second damping member mounted for rotation about a common rotational axis;

a coupling member operatively arranged in torque transmitting engagement between said first and second damping members;

said coupling member being connected in fixed rotative engagement with said first damping member and being axially displaceable relative to at least one of said damping members in the direction of said rotational axis; and spring means applying a spring force to said coupling member against axial displacement thereof, said spring force acting in the direction of said rotational axis between said coupling member and said first damping member;

said coupling member including axial slip surface means between said coupling member and said second damping member acting during relative rotation between said coupling member and said second damping member;

said coupling member is annular in configuration and is arranged to be axially displaceable between a pair of surfaces which are axially directed opposite to one another and which are firmly axially connected with said first damper member, said axially acting spring means being arranged axially on both sides of said coupling member between said coupling member and said surfaces;

axial thrust roller bearings are arranged axially on both sides of said coupling member between said springs and said coupling member.

* * * * *